United States Patent
Hin et al.

(10) Patent No.: US 6,652,966 B1
(45) Date of Patent: Nov. 25, 2003

(54) TRANSPARENT COMPOSITE MEMBRANE

(75) Inventors: Teoh Swee Hin, Singapore (SG); Tang Zheng Gui, Singapore (SG); Ramakrishna Seeram, Singapore (SG)

(73) Assignees: Agency for Science, Technology and Research (SG); National University of Singapore (SG)

( * ) Notice: Subject to any disclaimer, the term of this patent is extended or adjusted under 35 U.S.C. 154(b) by 0 days.

(21) Appl. No.: 09/121,633

(22) Filed: Jul. 23, 1998

(30) Foreign Application Priority Data

Jul. 24, 1997 (SG) .......................................... 97021630

(51) Int. Cl.$^7$ ................................................. D02G 3/00
(52) U.S. Cl. ................. 428/370; 428/295.1; 428/297.4; 428/304.4; 428/306.6; 428/308.4; 428/364; 428/518; 428/902
(58) Field of Search ............................. 428/370, 295.1, 428/297.4, 304.4, 306.6, 308.4, 364, 518, 902, 311.11, 314.2, 316.6, 319.3, 339, 903

(56) References Cited

U.S. PATENT DOCUMENTS

| | | | | |
|---|---|---|---|---|
| 4,767,825 A | * | 8/1988 | Pazos et al. ................ | 525/403 |
| 4,894,281 A | * | 1/1990 | Yagi et al. ................ | 428/298.7 |
| 5,061,545 A | * | 10/1991 | Li et al. ..................... | 428/156 |
| 5,222,987 A | * | 6/1993 | Jones ....................... | 433/228.1 |

* cited by examiner

*Primary Examiner*—Merrick Dixon
(74) *Attorney, Agent, or Firm*—Lawrence Y. D. Ho & Assoc.

(57) ABSTRACT

A transparent and flexible composite membrane produced from two immiscible polymers. The first polymer is a polymeric fibrous network with interconnecting pores. The second polymer is an elastomer with a refractive index matching the first polymer. The resultant composite membrane is a transparent interpenetrated network of polymers with an altered molecular structure, and mechanical strength superior to the parent polymers. A method of producing the new composite membrane involves dissolving the elastomer in a suitable solvent to form a diluted elastomeric solution, impregnating the polymeric membrane with the elastomer by adding the diluted elastomeric solution to the membrane to form a wet composite membrane, and then drying the wet composite membrane to form an interpenetrated membrane.

14 Claims, 3 Drawing Sheets

TRANSPARENT COMPOSITE MEMBRANE

FIELD OF THE INVENTION

The present invention relates to composite membranes. In particular, this invention relates to transparent composite membranes and methods for producing the same.

BACKGROUND OF THE INVENTION

Polymers such as polyurethane and polyester are commonly used in making membranes and bandages. Although such neat polymers are widely used, they tend to make thick sheets and do not possess good mechanical strength. Conventional polymer composites are comprised of fiber reinforcements with thermosetting or thermoplastic polymer matrices such as Proplast, a carbon fiber/PTFE composite. Composites with tailor made properties have also been developed for specific applications in biomedical, aerospace, chemical plants and automobile industries. In the biomedical field, transparent durable polymeric composite membranes have not been successfully developed, even though thicker materials such as Kelvar/elastomer and Spectra/elastomer fabrics have been reported. For example, Kutty, S. K. N. et. al., in J. Applied Polymer Sci. 46, 471–481 (1992) described the production of Kelvar/TPU by mixing the two polymers at 180° C. and 60 rpm, and then air drying at 105° C. for 2 hours. Although this material is relatively strong (exceeding 40 MPa), it is thick and completely opaque. Other flexible membranes used in biomedical applications, such as those used in skin patches, are predominantly made from neat polymers and they are normally opaque due to the presence of reinforcements with a different refractive index. Their thickness are also restricted to the fibers of reinforcement, typically in the mm range. These neat polymer membranes are also not very strong, with mechanical strength typically less than 15 MPa.

Ideally, the composite membrane should be thin, nonporous, and mechanically strong. For durability in a biological application, it is preferable that the composite membrane have a crystalline or semi-crystalline component to provide the reinforcement function, as it is known that crystalline and semi-crystalline structures are more resistant than amorphous structures to the invasion of body fluid and therefore may contribute substantially to the long term stability of the membrane when used as a biomaterial. Two types of semi-crystalline fibrous membranes have been described. The first type of membrane consists of uni-axially drawn fibers. This kind of membrane have fewer pores. The second type of membrane are made from bi-axially drawn fibers, such as described in U.S. Pat. No. 4,620,956. The high-modulus and high strength fiber and film are produced by the biaxial drawing of semi-crystalline polymers. The modulus of biaxially drawn polymers is less than half of that of its uniaxially drawn counterparts, and the fibers formed in this reinforcement material are of diameters in the nanoscale (less than 100 $\mu$m possible for polyethylene film). Although this membrane has the advantage of being semi-crystalline and ultra-thin, it is porous, fragile, completely opaque and non-elastic.

It is therefore highly desirable that a membrane of polymeric fibers be modified to have characteristics suitable for biomedical and other applications, such as transparency, elasticity and non-porosity. However, it is well known that elastomers such as polyurethane cannot be combined with polyethylene to produce a new transparent composite material although they have similar refractive indices, because these two materials have extremely different solubility parameters, and are therefore completely immiscible. As a result, predictions by physical principles would suggest that a combination of the two would produce an immiscible blend and an opaque product. This is the main reason for the lack of success, since there is no method known in the art to combine two immiscible polymers to form a transparent composite membrane.

OBJECT OF THE INVENTION

It is an object of the present invention to provide a transparent composite membrane from two immiscible polymers.

It is another object of the present invention to provide a flexible composite membrane.

SUMMARY OF THE INVENTION

The present invention provides a transparent and elastic composite membrane produced from two immiscible polymers. The first polymer is a polymeric fibrous network with, interconnecting pores. The second polymer is an elastomer with a refractive index matching the first polymer. The resultant composite membrane is a transparent interpenetrated network of polymers with mechanical strength superior to the parent polymers. A method of producing the new composite membrane involves dissolving the elastomer in a suitable solvent to form a diluted elastomeric solution, impregnating the polymeric membrane with the elastomer by adding the diluted elastomeric solution to the membrane to form a wet composite membrane, and then drying the wet composite membrane to form an interpenetrated network composite membrane.

DETAILED DESCRIPTION

Figure 1:
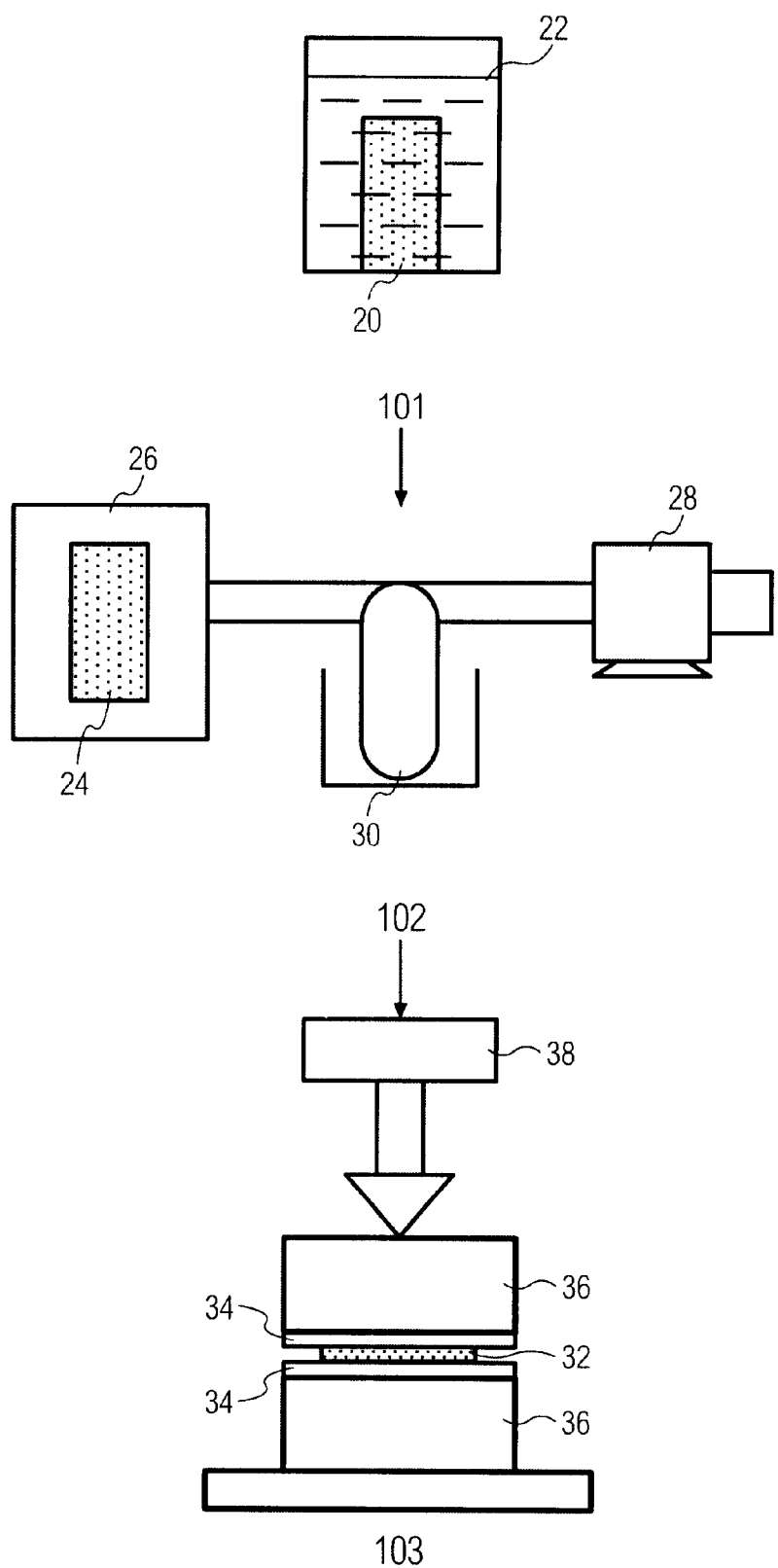
FIG. 1 is a flow chart showing a process of the present invention.

The present invention is a flexible, transparent composite membrane containing two immiscible polymers to form an interpenetrated network of polymer fibers and an elastomer. The first polymer is in the form of a fine fibrous network with interconnecting pores. The second polymer is an elastomer with a refractive index matching the first polymer. This interpenetration is produced from a process in which the elastomer is introduced into the polymeric membrane in a manner such that the interconnecting pores of the polymeric membrane become filled by the elastomer. The process involves impregnating the polymeric network with an elastomer diluted in a suitable solvent, and then removing the solvent such that the elastomer penetrates into and fill the pore of the network. The resultant membrane is transparent, flexible and has improved mechanical strength compared to the neat polymeric network. In the example shown below, a melting peak of a higher order is also observed in the new composite membrane.

Different polymeric fibrous network materials and elastomers may be selected and combined to give interpenetrated composite membranes of different desirable characteristics. The polymeric network is used primarily as a reinforcement structure from where the composite membrane is built. In order to obtain a high degree of transparency, the fibrous network should preferably have three characteristics. The first characteristic is porosity sufficiently high to allow effective penetration of the elastomer into the fibrous network. If full penetration is desired, a porosity of at least 75% is recommended. Secondly, the fibrous polymer should contain very fine fibers with diameter of less than 0.81 $\mu$m. i.e. similar or less than wavelengths of visible light. Fibers with thicker diameters would physically block visible light by their sheer size, and so would not be able to give good transparency even with full interpenetration. Thirdly, the fibrous polymer should possess a refractive index matching (i.e. very similar to) that of the elastomer such that refraction is minimized as light travels across the composite membrane.

A membrane is defined as transparent if it possesses the ability to transmit rays of light in such a way as to allow the human eye to see through to the object behind. For the normal human eye, a minimal measure of transmissivity is sufficient to give transparency. For example, a 1% transmissivity is sufficient to allow a human to see through a membrane while 100% transmissivity is complete transparent. With careful, inspection, a human can see through a membrane with any transmissivity over 0%.

To check whether the fibrous network and the polymer will produce a composite membrane of the desired transparency, (i.e. whether they posses matching refractive indices), a simple mixing test may be performed. This mixing test involves wetting the fibrous network with the elastomeric polymer solution, and checking the transparency of the wetted membrane, either by simple visual inspection or using a tranmissivity meter. Since transparency has a very wide range, the selection of the refractive indices depends on the desired properties of the composite membrane. Using this method, a person of ordinary skill will be able to match the refractive indices of the fibrous network to that of the elastomeric polymer without undue experimentation.

In addition to the inherent characteristics of the polymers, the preferred process of producing the composite membrane results in the interconnected pores of the fibrous network being completely filled with the elastomer such that there are no remaining pockets of air or voids to scatter light. Besides preventing light scattering, complete interpenetration also overcome the problem of stress concentration at the site of the pores. Stress concentration occurs because the large pores of the porous network serves as points of weakness for tearing when mechanical stress is applied to the neat polymeric fibrous membrane. When the network is completely interpenetrated with the elastomer, there are no more pores to allow stress concentration, and the composite membrane possess greater mechanical strength than the parent material.

The structure of the fibrous network may be amorphous, semi-crystalline or crystalline. If a crystalline or semi-crystalline polymer is selected, then the resulting membrane gives better fatigue property and better resistance to chemical degradation compared to an amorphous polymer. However, if the membrane is to be easily biodegradable, then an amorphous network may be preferred.

For semi-crystalline fibers, biaxially drawn network have advantages over uni-axially drawn networks, because of the greater degree of porosity found in the former. However, woven, uniaxially drawn networks would also allow effective interpenetration, and it is envisioned that the resultant membrane would have properties of particular benefit to certain applications.

The thickness of the fibrous network can be as thick as desired as long as the pores are interconnected and elastomer is able to interpenetrate through the membrane. Thin membranes have a range of 9–30 $\mu$m in thickness. For thicker membrane or film, the range can be as high as 3–6 mm in thickness. In order to produce a thick membrane of 3–6 mm, the porous network may be selected to possess properties which attract the elastomeric polymer, such as electrostatic attraction forces.

The following description sets forth various embodiments of the invention. While the present invention has been described particularly with references to FIGS. 1 to 6 as examples, it should be understood that the figures are for illustration only and should not be taken as limitation on the invention. In addition it is clear that the method and composite membrane of the present invention has utility in many applications besides biomedical fields where a transparent, durable and flexible interpenetrated composite membrane is required. It is contemplated that many changes and modifications may be made by one of ordinary skill in the art without departing from the spirit and the scope of the invention described.

FIG. 1 shows one general method for producing the interpenetrated composite membrane of the present invention. The first step 101 is to soak a fibrous network of polymers, such as a polymeric membrane 20, into a diluted elastomeric solution 22. The diluted elastomeric solution can be prepared by dissolving an appropriate amount of elastomer into a solvent which does not destroy the fibrous network polymer. A suitable solvent serves as a carrier of the elastomer, thus must be able to dissolve the elastomer of interest, and has desirable hydrophobicity properties. The relevance of various properties of the solvent would become apparent as the conditions for impregnation is set forth. An example of a suitable solvent is dimethyl formamide. Another example of a solvent is trichloroethane. Examples of elastomeric materials are polyurethane, silicone, natural rubber and butadiene styrene. Examples of materials useful as the starting polymeric networks include collagen, carbon and nylon, provided that the pore sizes are large enough for interpenetration to occur. In general, materials which can be produced as a fibrous polymeric networks and are compatible with the solvent selected and which contain pores of sufficient size for the diluted elastomer to penetrate, would be suitable as a starting reinforcement structure. The length of time required for incubation of the polymeric network with the elastomer depends on the temperature, pressure and the pore size of the polymeric network.

The second step is to remove the solvent. There are different ways that the solvent can be removed to achieve the desired interpenetration. Step 102 of FIG. 1 shows one way of solvent removal. In this example, the wet composite membrane 24 is held in a holding chamber 26 and subjected to a vacuum with or without heating. The vacuum may be created by a rotary pump 28, and the solvent may be recovered in a cold trap 30. A preferred temperature range of heating is 40 to 80° C. But for difficult to dry membrane, the temperature may go as high as just below the melting point of the fibrous network. This vacuuming method of solvent removal is very useful in climates where high humidity is experienced, particularly if used in combination with a solvent such as dimethyl formamide. This is because dimethyl formamide is a very hydrophilic solvent which absorbs water easily. As a result, moisture which is present in the air is readily absorbed by this diluted elastomeric solution, and the moisture becomes difficult to remove under ambient conditions of high humidity. Thus if a solvent of low hydrophobicity is found to be suitable and compatible with the polymeric network and elastomer of choice, then drying conditions should be optimized to allow complete drying of the solvent. If a highly hydrophobic solvent such as trychloroethane is used, it may be possible to dry the wet membrane under ambiance conditions without the aid of a vacuum. Another example of a solvent drying method is to subject the wet composite membrane to a stream of dry nitrogen. This provides a dry environment to prevent absorption of moisture during the process of solvent removal. In certain conditions such as high humidity, heat of 30 to 80° C. may also be applied to increase the efficiency of the nitrogen drying process.

The third step is heat compaction treatment. This step allows the elastomer to penetrate into all the pores of the polymeric network, and removes the remaining voids within the pores. Step 103 of FIG. 1 is an example of this process. In this example, the composite membrane is laid flat between two Teflon sheets 34, and two heated platen 36. Pressure is then applied from the top while the composite membrane is heated. Teflon is a suitable material for compaction because membranes do not usually stick onto Teflon and therefore allows easy removal of the final product from the heated platen. However, other materials may be used for different composite materials. Although full interpenetration is usually preferred, it is possible that for certain applications, a controlled amount of voids or residual pores may be desirable. An acceptable amount of void remaining after the heat compaction treatment depends on the characteristics desired.

The amount of void remaining on the composite membrane after the entire production process is determined by the amount of heat and pressure that is used in the heat compaction treatment. For full interpenetration to give a transparent membrane, the pressure may range from normal atmospheric pressure (approximately 100 Kilopascals) to as high pressure as the composite membrane is able to withstand. The temperature for heating may range from normal ambient temperature to as high a temperature as the composite membrane is able to withstand without melting or deteriorating. In addition, it is possible to omit the solvent dilution step altogether, and use neat elastomer for impregnation if high heat and high pressure is employed to drive the elastomer into the pores of the polymeric network to give an interpenetrated network. If a highly porous polymeric network is used, it is also possible to omit certain step and achieve interpenetration, since the large pores may allow impregnation without steps such as vacuuming, heating or applying pressure.

The resultant interpenetrated composite membrane is flexible, strong and non-porous. If porosity is desired, there are many conventional techniques available for increasing the porosity, for example by adding texture or adding pores by laser beams.

The following are examples of specific composite membranes that may be produced by the method given above.

EXAMPLE 1

In this example, Solupor™ 7P03 supplied by DSM Solutech BV, the Netherlands, a biaxially drawn ultra high molecular weight polyethylene (UHMWPE) film, is used as the polymeric network reinforcement. Solupor™ 7P03 has a base weight of 7 g/m$^2$, thickness of 35 cm, tensile strength of 35 MPa, secant modulus of 300 MPa, and 20% elongation at break. The elastomer is elastomeric polyurethane (PU), Toyobo TM5 developed by Toyobo Co., Osaka, Japan. The monomer components are composed of polytetramethylene glycol, 4,4'-diphenylmethane diisocyanate, and propylene diamine. The solvent used in this example is dimethyl formamide. The PU is prepared as 15% by weight solution in dimethyl formamide for impregnation. In this example, both UHMWPE and PU have refractive indices of approximately 1.5, thereby allow the resultant composite membrane to be transparent.

For impregnation, immerse the UHMWPE membrane in the 10% PU solution for 72 hours or more, whereupon the membrane turns translucent in appearance. The impregnation time may be varied by changing the temperature of the solution.

After impregnation, a wet translucent composite membrane is obtained. Transfer the wet composite membrane to a drying chamber connected to a vacuum pump. The purpose of the vacuum is to ensure a moisture free environment. Set the vacuum pump at 740 mm Hg vacuum. The temperature within the drying chamber is set to remain at ambient temperature for more than 2 hours until the wet composite membrane becomes transparent, whereupon the temperature of the chamber is increased to a range of 40–80° C. for 8 hours or more. Preferably, the wet composite membrane is heated to 40° C. for 8 hours. The time for soaking and drying can be reduced if the temperature and/or pressure are increased. The resultant product is a dried composite membrane that is transparent and is noted as type 1 membrane.

EXAMPLE 2

The material used and the impregnation and drying steps are the same as in example 1. After drying, the dried composite membrane can be transferred to the heat platen and heat compacted under 2600 psi for 1.5 hours at 110–135° C., with a temperature of 125° C. preferred. The application of heat and pressure removes any small bubbles or voids that might cause refraction of incident light. However, the temperature limit should not exceed the melting temperature of the polymeric membrane, which is 135° C. for polyethylene. The heat compaction process also ensures uniformity in thickness of the UHMWPE-PU composite membrane. The membrane produced in this example is denoted type 2 membrane.

For a thicker membrane, more sheets of the Solupor™ may be stacked together for impregnation. The drying and heating time may be adjusted accordingly, and the resulting membrane is a single thicker membrane with interpenetrated polymers.

Figure 2:
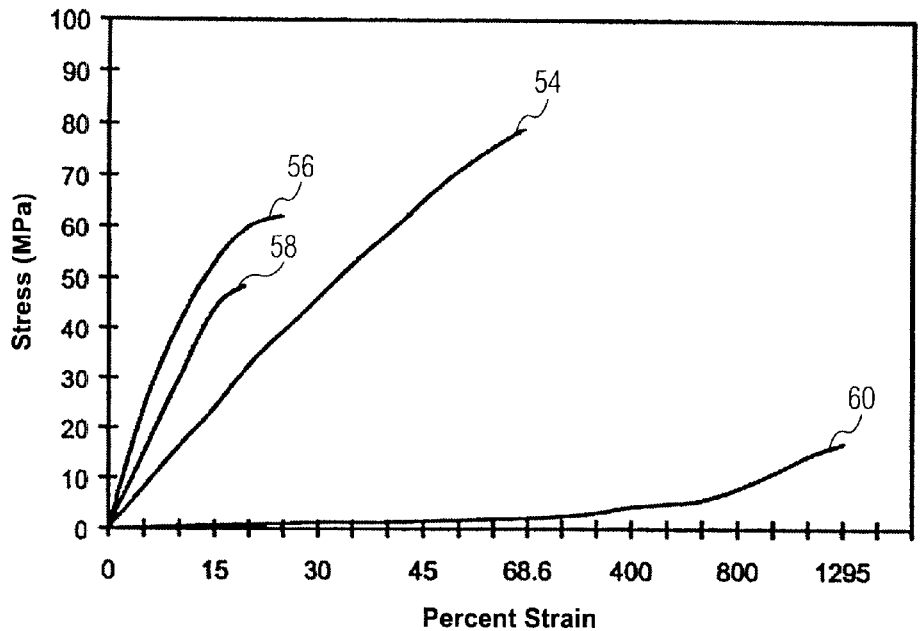
FIG. 2 is a diagram illustrating the stress strain relationship of type 1, type 2, neat polyurethane and neat polyethylene membranes.

Nuerous tests have been performed on the composite membranes to characterize them. Mechanical strength was tested and the stress strain curves of the type 1 (54) and type 2 (56) membranes are shown in FIG. 2, together with those of the neat polyethylene ((PE) reinforcement membrane (58) and the neat polyurethane (PU) membrane (60) for comparison. Results indicate that the type 1 membrane possesses good strain tolerance as well as good stress tolerance. This is in contrast to the neat PU membrane, which has high strain tolerance but very little stress tolerance, and the neat PE membrane, which has greater stress tolerance than neat PU, but shows lack of strain tolerance. Even the type 2 membrane, which has not gone through the heat compaction treatment, has achieved a higher stress tolerance than the neat PE membrane.

The tensile properties of the respective membranes have also been tested and summarized in Table 1. Compared to neat PU membranes, the type 2 membrane displays 5 times higher tensile strength and 50 times higher modulus. Compared to biaxially drawn neat PE membrane, the type 2 membrane has 3 times larger failure strain and 5 times higher tensile toughness (energy to break, defined as the area under the stress strain curve).

TABLE 1

TENSILE PROPERTIES

| Material | Strength (MPa) | Strain (%) | Young's Modulus (MPa) | Energy at break (J) |
|---|---|---|---|---|
| PE membrane | 48.9 ± 4.2 | 18.2 ± 1.2 | 313.6 ± 30.9 | 0.042 ± 0.007 |
| Polyurethane | 16.9 ± 1.6 | 1295.6 ± 53.2 | 2.6 ± 0.2 | 2.469 ± 0.010 |
| Type 1 membrane | 62.3 ± 4.3 | 25.6 ± 1.6 | 460.3 ± 63.4 | 0.093 ± 0.004 |
| Type 2 membrane | 79.9 ± 0.8 | 68.6 ± 5.0 | 160.6 ± 3.5 | 0.211 ± 0.028 |

Thermal properties of these membrane were also tested. The bfferential Scanning Calorimetry (bSC) results of the various materials are summarized in Table 2. Thermal tests indicated that present processing technique has a significant effect on the crystal structure of the composite membrane. An important phenomenon is the increase in melting temperature of the type 1 membrane compared to the neat PE membrane. This phenomenon is a clear indication that the current process has produced a new material that has far better properties than the parents. Another property that is directly related to the thermal sensitivity of a material is creep deformation, which is a change in dimension under constant loading for a period of time. As creep deformation is a function of the malting temperature, this new composite material should have better creep resistance than that of neat PE. The thermal properties of the composite membranes are further illustrated by the DSC curves shown in FIG. 3.

TABLE 2

DIFFERENTIAL SCANNING CALORIMETRY RESULTS

| | PE | Type 1 | Type 2 | PU |
|---|---|---|---|---|
| $T_m$ (°C.) | 138 | 147 | 144 | 180–250* |

*decompositlon temperature

Figure 4:
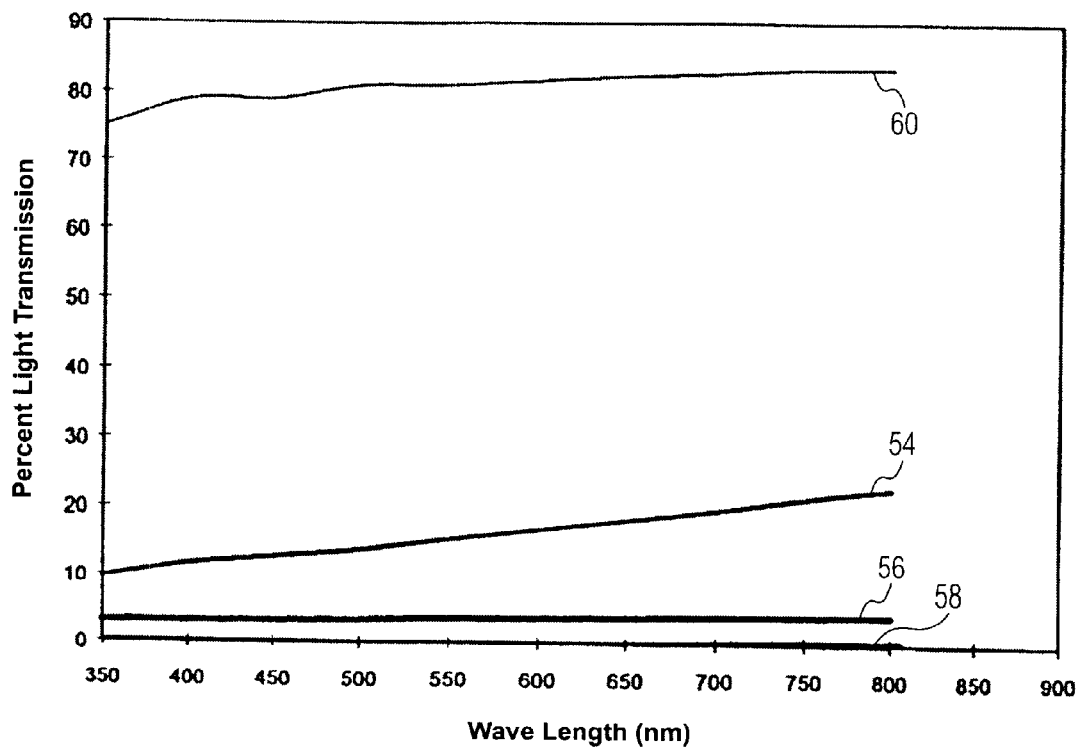
FIG. 4 is a diagram to show the optical properties of various membranes.
Figure 3:
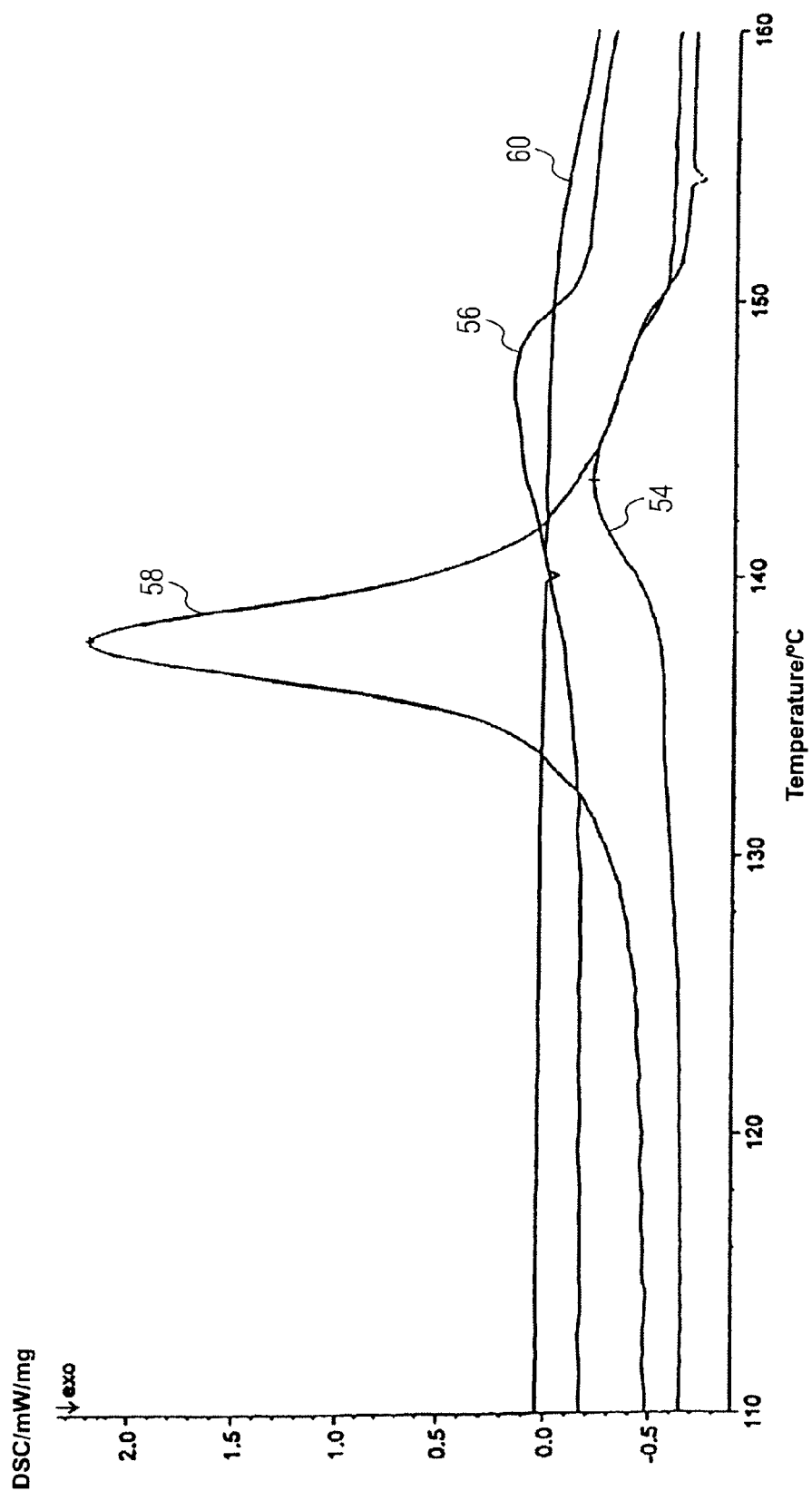
FIG. 3 is a diagram to show the thermal behavior of various membranes.

FIG. 4 shows the light transmission characteristics of different materials. Neat PE membrane (58) has a light transmission percentage (T%) ranging from 0.03 to 0.04, which is too low to be shown in FIG. 5. The composite membranes type 1 and type 2, though, shows 600 to 800 times respectvely higher light transmission ability than neat PE. The percentage transmission for the type 1 membrane is up to 5% and that of the type 2 membrane is up to 25%. The fabrication process completely changed the opaque polyethylene membrane into a transparent one. Transparency is also a good indicator for the interpenetration of PU through the PE network, and for the elimination of internal voids by the processes described in the two examples.

The biocompatibility of the type 1 and type 2 membranes were also tested by growing human bone marrow cells on these membranes. The bone marrow cells were cultured for periods of up to 28 days to test for osteocompatibility. Cultures were characterized in terms of cell viability/ proliferation, total protein content, alkaline phosphatase activity and formation of mineral deposits. Results show that the type 1 and type 2 membranes are osteocompatible, and indicate a clear potential application of this material in biomedical fields.

That the new composite membrane possesses mechanical strength over and above that of the parent polymer is entirely unexpected, since a combination of two immiscible polymers is expected to give an immiscible blend of the two, without changing their respective characteristics. Therefore, a person of ordinary skill would have expected the stress tolerance of the composite membrane to be the same as that of neat PE. In this case however, the mechanical properties of the new composite material is superior to the parent material, indicating that an entirely new composite has been made. This is further confirmed by the thermal properties, which shows clearly that a new material has been successfully developed which has a different melting peak from the parent material. It is envisioned that numerous useful applications may be developed based on the teachings of the present invention.

What is claimed:

1. A transparent and flexible composite membrane comprising:

a biaxially drawn porous polymeric fibrous network with interconnecting pores comprising fibers of diameter less than 0.8 μm and an elastomeric polymer having a refractive index matching the refractive index of said biaxially drawn porous polymeric fibrous network, said elastomeric polymer further having solubility parameters immiscible with the solubility parameters of said biaxially drawn porous polymeric fibrous network;

said biaxially drawn porous polymeric fibrous network impregnated with said elastomeric polymer to form an interpenetrated network;

whereby the melting peak of said transparent and flexible composite membrane is higher than the melting peak of said biaxially drawn porous polymeric fibrous network.

2. A composite membrane according to claim 1 wherein the composite membrane is biocompatible.

3. A composite membrane according to claim 1 wherein said fibrous network has a semi-crystalline structure.

4. A composite membrane according to claim 1 wherein said fibrous network has a crystalline structure.

5. A composite membrane according to claim 1 wherein said fibrous network has an amorphous structure.

6. A composite membrane according to claim 1 wherein said fibrous network comprises polyethylene.

7. A composite membrane according to claim 1 wherein said fibrous network comprises semi-crystalline polyethylene.

8. A composite membrane according to claim 1 wherein said fibrous network comprises ultra high molecular weight polyethylene.

9. A composite membrane according to claim 1 wherein said fibrous network comprises biaxially drawn semi-crystalline polyethylene.

10. A composite membrane according to claim 1 wherein said fibrous network comprises woven, uni-axially drawn semi-crystalline polyethylene.

11. A composite membrane according to claim 1 wherein said elastomer comprises polyurethane.

12. A composite membrane according to claim 1 wherein said elastomer comprises derivatives of polyurethane.

13. A composite membrane according to claim 1 wherein said elastomer comprises polyurethane having monomer components further comprising polytetramethylene glycol, 4,4'-diphenylmethane dilsocyanate and propylene diamine.

14. A composite membrane according to claim 1 wherein said elastomer is biodegradable.

* * * * *

UNITED STATES PATENT AND TRADEMARK OFFICE
CERTIFICATE OF CORRECTION

PATENT NO. : 6,652,966 B1
DATED : November 25, 2003
INVENTOR(S) : Teoh Swee Hin

It is certified that error appears in the above-identified patent and that said Letters Patent is hereby corrected as shown below:

<u>Column 6,</u>
Line 49, delete "Nuerous" and substitute therefor -- Numerous --.

<u>Column 7,</u>
Line 19, delete "bfferential" and substitute therefor -- Differential --.
Line 19, delete "(bSC)" and substitute therefor -- (DSC) --.
Line 31, delete "malting" and substitute therefor -- melting --.

Signed and Sealed this

Thirtieth Day of March, 2004

JON W. DUDAS
*Acting Director of the United States Patent and Trademark Office*